US008616284B2

(12) United States Patent
Crews et al.

(10) Patent No.: US 8,616,284 B2
(45) Date of Patent: Dec. 31, 2013

(54) METHODS FOR REMOVING RESIDUAL POLYMER FROM A HYDRAULIC FRACTURE

(75) Inventors: James B. Crews, Willis, TX (US); Tianping Huang, Spring, TX (US)

(73) Assignee: Baker Hughes Incorporated, Houston, TX (US)

(*) Notice: Subject to any disclaimer, the term of this patent is extended or adjusted under 35 U.S.C. 154(b) by 359 days.

(21) Appl. No.: 13/090,433

(22) Filed: Apr. 20, 2011

(65) Prior Publication Data

US 2011/0253365 A1 Oct. 20, 2011

Related U.S. Application Data

(63) Continuation-in-part of application No. 12/435,908, filed on May 5, 2009, now Pat. No. 8,056,630, which is a continuation-in-part of application No. 11/689,203, filed on Mar. 21, 2007, now Pat. No. 7,527,102, and a continuation-in-part of application No. 11/697,954, filed on Apr. 9, 2007, now Pat. No. 7,875,575.

(51) Int. Cl.
*E21B 21/00* (2006.01)
*E21B 43/22* (2006.01)

(52) U.S. Cl.
USPC ........... 166/312; 166/300; 166/310; 166/371; 166/400

(58) Field of Classification Search
None
See application file for complete search history.

(56) References Cited

U.S. PATENT DOCUMENTS

| 4,004,639 | A | 1/1977 | Sandiford |
|---|---|---|---|
| 5,735,349 | A | 4/1998 | Dawson et al. |
| 5,964,295 | A | 10/1999 | Brown et al. |
| 6,433,075 | B1 | 8/2002 | Davies et al. |
| 6,605,570 | B2 | 8/2003 | Miller et al. |
| 6,667,280 | B2 | 12/2003 | Chang et al. |
| 6,703,352 | B2 | 3/2004 | Dahayanake et al. |
| 6,767,869 | B2 | 7/2004 | DiLullo et al. |

(Continued)

FOREIGN PATENT DOCUMENTS

| WO | 2008091956 A2 | 7/2008 |
|---|---|---|
| WO | 2008096165 A1 | 8/2008 |

OTHER PUBLICATIONS

R. Bandyopadhyay, et al., "Effect of Silica Colloids on the Rheology of Viscoelastic Gels Formed by the Surfactant Cetyl Trimethylammonium Tosylate," Journal of Colloid and Interface Science 2005, pp. 585-591, vol. 283.

(Continued)

*Primary Examiner* — Zakiya W Bates
(74) *Attorney, Agent, or Firm* — Mossman, Kumar & Tyler, P.C.

(57) ABSTRACT

Viscoelastic surfactant (VES) gelled aqueous fluids containing water, a VES in an amount effective to increase the viscosity of the water, and an internal breaker may be useful in removing a residual polymer from a hydraulic fracture. Optionally, a pseudo-crosslinker may be present to further improve the properties related to treatment fluid placement and polymer clean-up. A plurality of aliquots of VES gelled fluid may be injected into a subterranean formation. A stop-start interval may exist between the injection of each aliquot. The VES gelled fluid may contact at least some of the residual polymer in the hydraulic fracture, and a broken fluid is formed once the viscosity of the VES gelled fluid is reduced with the internal breaker. At least a portion of the residual polymer and a majority of the broken fluid may be removed.

21 Claims, 5 Drawing Sheets

(56) References Cited

U.S. PATENT DOCUMENTS

| | | |
|---|---|---|
| 6,828,280 B2 | 12/2004 | England et al. |
| 6,903,054 B2 | 6/2005 | Fu et al. |
| 7,008,908 B2 | 3/2006 | Chan et al. |
| 7,052,901 B2 | 5/2006 | Crews |
| 7,060,661 B2 | 6/2006 | Dobson, Sr. et al. |
| 7,081,439 B2 | 7/2006 | Sullivan et al. |
| 7,115,546 B2 | 10/2006 | Qu et al. |
| 7,159,659 B2 | 1/2007 | Welton et al. |
| 7,265,079 B2 | 9/2007 | Willberg et al. |
| 7,343,972 B2 | 3/2008 | Willingham et al. |
| 7,347,266 B2 | 3/2008 | Crews et al. |
| 7,550,413 B2 | 6/2009 | Huang et al. |
| 7,595,284 B2 | 9/2009 | Crews |
| 7,645,724 B2 | 1/2010 | Crews |
| 7,691,789 B2 | 4/2010 | Fu et al. |
| 7,723,272 B2 | 5/2010 | Crews et al. |
| 7,728,044 B2 | 6/2010 | Crews |
| 2002/0076803 A1 | 6/2002 | Crews |
| 2003/0139298 A1 | 7/2003 | Fu et al. |
| 2003/0188870 A1 | 10/2003 | Hinkel et al. |
| 2004/0031611 A1 | 2/2004 | Huang et al. |
| 2005/0067165 A1 | 3/2005 | Cawiezel et al. |
| 2005/0252658 A1 | 11/2005 | Willingham et al. |
| 2006/0041028 A1 | 2/2006 | Crews |
| 2006/0211775 A1 | 9/2006 | Crews |
| 2006/0211776 A1 | 9/2006 | Crews |
| 2007/0056737 A1 | 3/2007 | Crews et al. |
| 2007/0151726 A1 | 7/2007 | Crews et al. |
| 2007/0299142 A1 | 12/2007 | Crews et al. |
| 2008/0051302 A1 | 2/2008 | Crews et al. |
| 2008/0099207 A1* | 5/2008 | Venditto et al. ............ 166/308.3 |
| 2008/0139419 A1 | 6/2008 | Huang |
| 2008/0153720 A1 | 6/2008 | Huang et al. |
| 2008/0271888 A1 | 11/2008 | Huang et al. |
| 2009/0192053 A1 | 7/2009 | Crews et al. |
| 2009/0272534 A1 | 11/2009 | Huang et al. |
| 2010/0252266 A1 | 10/2010 | Huang et al. |

OTHER PUBLICATIONS

E. Ali et al., "Effective Gas Shutoff Treatments in a Fractured Carbonate Field in Oman," SPE 102244, pp. 1-12, 2006 SPE Annual Technical Conference & Exhibition, Sep. 24-27, 2006.

H.A. Nasr-El-Din, "Lessons Learned and Guidelines for Matrix Acidizing With Viscoelastic Surfactant Diversion in Carbonate Formations," SPE 102468, pp. 1-11, 2006 SPE Annual Technical Conference and Exhibition, Sep. 24-27, 2006.

H.A. Nasr-El-Din, "Acid Fracturing of Deep Gas Wells Using a Surfactant-Based Acid: Long-Term Effects on Gas Production Rate," SPE 102469, pp. 1-12, 2006 SPE Annual Technical Conference and Exhibition, Sep. 24-27, 2006.

J.A. Ayoub et al.,"New Findings in Fracture Cleanup Change Common Industry Perceptions," SPE 98746, International Symposium and Exhibition on Formation Damage Control, Feb. 15-17, 2006, Lafayette, La.

\* cited by examiner

METHODS FOR REMOVING RESIDUAL POLYMER FROM A HYDRAULIC FRACTURE

CROSS REFERENCE TO RELATED APPLICATION

This application is a continuation-in-part application of U.S. application Ser. No. 12/435,908 filed May 5, 2009, which is itself a continuation-in-part application of both U.S. Ser. No. 11/689,203 filed Mar. 21, 2007, now U.S. Pat. No. 7,527,102 issued on May 5, 2009 and U.S. Ser. No. 11/697,954 filed Apr. 9, 2007, now U.S. Pat. No. 7,875,575 issued on Jan. 25, 2011; all three of which are incorporated herein by reference in their entirety.

TECHNICAL FIELD

The present invention relates to viscoelastic surfactant (VES) gelled aqueous fluids containing water, a VES in an amount effective to increase the viscosity of the water, and an optional internal breaker useful in removing a residual polymer from a hydraulic fracture.

BACKGROUND

Hydraulic fracturing is a process commonly used to increase the flow of desirable fluids, such as oil and gas, from a portion of a subterranean formation. Hydraulic fracturing operations generally involve pumping a viscous fracturing fluid into a subterranean formation or zone at a rate and pressure sufficient to cause the formation or zone to break down with the attendant production of one or more fractures. The pressure required to induce fractures in rock at a given depth is known as the "fracture gradient." Nearly any fluid given enough volume and pressure can be used to fracture a subterranean formation. However, fracturing fluids generally include a viscosifying or gelling agent such as a cross-linked or uncross-linked polysaccharide material, or a viscoelastic surfactant, to affect the rheology by increasing viscosity of the fluid.

Viscosified fluid is commonly used to generate a hydraulic fracture to improve reservoir production. One of the most common types of viscosified fluids is polymer-based, such as a borate cross-linked guar fracturing fluid. However, when using polymer-based fracturing fluids, there may be a considerable amount of residual polymer left within the hydraulic fracture after the treatments. There may be cases where improvement in the amount of polymer removed from the fracture, particularly around the immediate wellbore region, may significantly enhance the rate of hydrocarbon recovery from the reservoir.

In some instances, an aqueous fracturing fluid may be separate from the fluid carrier of the proppant. For example, the fracturing fluid may be prepared including a viscosifying agent, such as a borate cross-linked hydroxypropyl guar gel. The cross-linked gel is introduced into a subterranean formation through a wellbore at a rate and pressure sufficient to result in initiation of a fracture in the formation and development of a filter cake to control fluid-loss. The first fluid may include a quantity of proppant. A second fracturing fluid also is prepared. The second fluid comprises a viscosifying agent and may or may not include a crosslinking agent for the viscosifying agent. A proppant is added to the second gel, and the fluid is introduced into the formation and into the fracture created by the first fluid. The second fluid functions to carry and transport the proppant into the created fracture and, more importantly, to induce a break of the filter cake formed from the first fluid. The second fluid causes an increase in the leak-off rate of the fluid through the fracture faces which improves the ability of the proppant to pack within the fracture by dehydration of the fracturing fluid. Unfortunately, the use of even one polysaccharide-containing fluid tends to cause formation damage when the filter cake formed is removed. Using two polysaccharide-containing fluids increases this risk.

Enhancing a fracture includes enlarging a pre-existing fracture in the formation. As the fracture is created or enhanced, a portion of the fluid contained in the viscous fracturing fluid leaks off into the formation, and a filter cake comprised of deposited gelling agent is built up on the walls of the fracture. Particulates, such as grains of sand, may be suspended in the fracturing fluid and introduced into the created fractures. As the viscous fracturing fluid leaks off into the formation, particulates aggregate in proppant packs within the fracture. The proppant packs function to prevent the fracture from fully closing upon the release of pressure, forming conductive channels through which fluids may flow to (or from) the wellbore.

Gravel packing is another subterranean application that involves the use of particulates suspended in a viscous fluid. A "gravel pack" is used to at least partially reduce the migration of unconsolidated formation fines into the wellbore. To form a gravel pack, particulate material, such as sand, is delivered downhole suspended in a viscous fluid. The fluid may then leak-off into the formation or be recovered from the wellbore. Gravel packing operations commonly involve placing a gravel pack screen in the wellbore neighboring a specified portion of the subterranean formation and packing the annulus between the screen and the subterranean formation with particulate materials. The particulates are sized to inhibit the passage of formation fines through the gravel pack with produced fluids.

In some situations, hydraulic-fracturing operations and gravel-packing operations may be combined into a single operation to stimulate production and to reduce the production of unconsolidated formation particulates. Such treatments are often referred to as "frac-pack" operations. In some cases, these treatments are completed with a gravel-pack screen assembly in place with the fracturing fluid being pumped through the annular space between the casing and screen. In such a situation, the fracturing operation may end in a screen-out condition creating an annular gravel pack between the screen and casing.

Gelling agents have heretofore been utilized to gel a base fluid, producing a fluid with adequately high viscosity. These gelling agents can be biopolymers or synthetic polymers that, when hydrated and at a sufficient concentration, are capable of forming a more viscosfied fluid. Common gelling agents include polysaccharides (such as xanthan, guar gum, diutan, succinoglycan, scleroglucan, etc.), synthetic polymers (such as polyacrylamide, polyacrylate, polyacrylamide copolymers, and polyacrylate copolymers), and surfactant gel systems. Guar and derivatized guar polymers, such as hydroxypropylguar, are economical water soluble polymers which can be used to create high viscosity aqueous fluids. Surfactant gel systems also have been used in subterranean formations at these temperatures, but such systems can be expensive, can be sensitive to impurities, and may require hydrocarbon breakers. To increase the viscosity of the resultant fluid, the gelling agents may be crosslinked through an applicable crosslinking reaction comprising a crosslinking agent. Conventional crosslinking agents usually comprise a metal complex or other compound that interacts with at least two polymer molecules to form a "crosslink" between them.

Typically, after a high viscosity, particulate-laden fluid is pumped into a wellbore and the particulates are placed as desired, the fluid will be caused to revert into a low viscosity fluid. This process is often referred to as "breaking" the fluid. The treatment fluid "breaks," or decreases in viscosity, so that it can more easily be removed from the well, while leaving a proppant and/or gravel pack in the fracture. Breaking the gel is most commonly accomplished by adding a breaker to the treatment fluid prior to pumping it into the wellbore. Breakers, such as oxidizers, enzymes, and acid release agents, have been used successfully in breaking polymer-gelled fluids. Depending on the crosslinking agent used, a fluid may be broken by "delinking" the crosslinks between the gelling agent molecules. In such instances, this may be useful because oftentimes the fluid can be recovered, recrosslinked, and reused, whereas more typical "broken" fluids cannot. However, for typical crosslinked polymer hydraulic fracturing treatments, there is residual polymer which remains in the hydraulic fracture in the form of a filter cake after the treatment. Studies show that even though the polymeric filtercake may be termed "broken", the mass of "broken" residual polymer is still difficult for the reservoir to produce fluids from the fracture during well production, as discussed in SPE 98746 "New Findings in Fracture Cleanup Change Common Industry Perceptions". As a result, the disadvantage associated with using crosslinked polymer treatment fluids is that they can leave polymeric residue in the formation that can impact the productivity of the well (i.e. reduce fracture conductivity and the effective fracture length).

The ability to remove residual polymer post-stimulation operations has generated considerable interest in recent years. Attempts have been made to improve the composition and placement of clean-up fluids to remove residual polymer left behind by a polymer-gelled fluid but have often resulted in limited success. However, it would be desirable to provide a method by which residual polymer can be removed with a much more effective and simpler mechanism.

SUMMARY

There is provided, in one form, a method for removing a residual polymer from a hydraulic fracture. The method may include injecting a plurality of aliquots of viscoelastic surfactant (VES) gelled fluid into a subterranean formation, where a stop-start interval exists between the injection of each aliquot. The method may include contacting at least some of the residual polymer in the hydraulic fracture with the VES gelled fluid. The method may include reducing the viscosity of the VES gelled fluid with the internal breaker to form a broken and easily producible fluid. The method may optionally include removing at least a portion of the residual polymer along with a majority of the broken fluid. The viscoelastic surfactant gelled fluid may include water, at least one viscoelastic surfactant in an amount effective to increase the viscosity of the water, and optionally, at least one internal breaker to degrade VES micelles. The internal breaker may be selected from the group consisting of bacteria, transition metal ion sources, saponified fatty acids, mineral oils, hydrogenated polyalphaolefin oils, saturated fatty acids, unsaturated fatty acids and combinations thereof. Optionally, a pseudo-crosslinker for VES micelles may be used to further improve one or more fluid properties, such as: low shear rate fluid viscosity, increase high temperature thermal stability, and reduce fluid leakoff during injection. Improved fluid leakoff control may help keep the cleanup fluid within the hydraulic fracture during placement for more uniform and wider area distribution than without a pseudo-crosslinker present.

In a non-limiting embodiment, the stop-start interval may be as short as from about 0.25 minutes to as long as about 60 minutes between the injecting of each aliquot. There is further provided in another non-limiting embodiment, the stop-start intervals between the injection of each aliquot may be of equal durations.

The stop-start interval between the injection of each aliquot may enhance the fluid placement of a treatment fluid that has delayed release of a polymer breaker and/or other agents in a hydraulic fracture. It may also hydraulically overcome the residual polymer yield stress keeping the residual polymer within the hydraulic fracture during reservoir production. Once the polymer is moved during injection, or moved by the repetitious stop-start injections, there is reduced yield stress for movement and cleanup of the moved polymer after the remedial cleanup treatment.

DETAILED DESCRIPTION

A method for using an oscillating stop-start method of injecting viscoelastic surfactant (VES) gelled fluid into a hydraulic fracture for removing a residual polymer from the hydraulic fracture has been discovered. Variable amounts of polymer remain within the reservoir after the stimulation of a well is done. To stimulate a well, a fracturing fluid is injected into the well as part of the stimulation operation. Fracturing fluids usually contain water, proppant, and other fluids to reduce friction pressure while pumping fluid into the wellbore. Gels, friction reducers, cross-linkers, breakers, and surfactants may be added to the fracturing fluid for improving the results of the stimulation operation, as well as the productivity of the well. A fracturing fluid may also contain a proppant to assist in keeping the fracture open for the stimulation of a well. The proppant within a frac fluid are the sized particles, which may be made of sand grains, resin-coated sand or high-strength ceramic materials like sintered bauxite, or other man-made products may be used. Proppants are carefully chosen based on their size and sphericity in order to provide efficient fluid production from a reservoir.

The capability of this method may be very significant, since many unconventional fracturing treatments no longer use polymer-based fluids but rather slickwater (i.e. water with chemicals such as friction reducers, biocides, microemulsions, surfactants and scale inhibitors added to it) to fracture and place proppant in the reservoir. A huge amount of water is typically pumped at high rates because polymer-viscosified fluids may leave too much residual gel damage that impairs the fracture conductivity. VES-gelled fluids, which are composed of elongated thread-like-micelle (TLM) surfactant structures in brine, are known to be less damaging compared to polymer-based systems. When the pumping of the TLM fluid with a much higher viscosity at very low and near-zero shear rates has temporarily stopped, an increased hydraulic force is uniquely created and applied to the residual polymer mass within the pores of the proppant once injection of the TLM fluid resumes. The process of stopping the pumping followed by a restart of viscous TLM fluid placement may then move residual polymer by overcoming the residual polymer mass yield stress. Once the yield stress of the residual polymer mass has been overcome, and the polymer mass in the pores of the proppant pack has moved, less cleanup forces are required for polymer removal from the fracture during well production. The amount of hydraulic force applied during the stop-start process can be further optimized by increasing and/or decreasing the concentration of viscoelastic surfactant product during the cleanup treatment stages. In one non-limiting example, the concentration of VES product may be increased for each stop-start stage. For example, an eight stage treatment may have an initial viscoelastic surfactant loading with a VES of about 1.0 vol %, and the last stage treatment may have a VES content of about 2.0 vol %. In another non-limiting example, a twelve stage treatment may have an initial VES loading of about 1 vol %, increases to about 3 vol % by the sixth stage, and is then lowered to 2 vol % by the last stage. Water is herein defined as any liquid that has a water component, e.g. brine, or another aqueous solution.

The removal of residual polymer improves the fracture conductivity, particularly in the near well-bore region, which can significantly enhance the rate of hydrocarbon production. The ability to remove residual polymer should also allow polymer-based fracture treatments to be used more often in place of high rate slickwater fracture treatments. Additionally, internally broken VES fluid is also considered a good cleanup fluid, since it has brine-like viscosity and is surfactant laden, which may assist in chemically treating the moved residual polymer mass to further aid in polymer removal. In one non-limiting embodiment, a polymer breaker (i.e. oxidizers, enzymes, acids, polyols, catalysts, etc.) may be included in the TLM fluid composition that may remain within the TLM structured-fluid during placement. After TLM internal breakers degrade the TLM fluid viscosity, the polymer breakers may be released within the proppant of the hydraulic fracture for more uniform placement and contact with the residual polymer. Additional polymer degradation may further reduce the residual polymer mass yield stress for improving residual polymer cleanup. In another non-limiting embodiment, other cleanup or secondary agents may be utilized in the remedial polymer cleanup fluid, such as microemulsion cleanup additives, other surfactants, fluid loss control agents, acid generating agents, clay control agents, biocides, scale control and/or removal agents, fines migration control and/or removal agents, polymer fragments solubilizers and/or dispersants, crosslinker complexors, select bacteria, and the like and combinations thereof.

A plurality of aliquots of viscoelastic surfactant (VES) gelled fluid may be injected into a subterranean formation, where a stop-start interval exists between the injection of each aliquot. The stop-start interval may have from about 0.25 minutes independently to about 60 minutes between the injection of each aliquot where "independently" as used herein means that any lower threshold may be combined with any upper threshold to define an acceptable alternative range. In another non-restrictive version, the stop-start interval may range from about 1 minute independently to about 30 minutes, alternatively from about 2 minutes independently to about 20 minutes. The stop-start of the fluid movement may create a displacement force on the residual polymer and move the residual polymer within the fracture during the injecting phase. The stop-start interval may put hydraulic pressure into or onto the proppant pores where the residual polymer resides. Once moved within the fracture, it may be easier for the reservoir fluids to produce (i.e. displace) the moved polymer during production from the fracture proppant. In one non-limiting embodiment, a select amount of fluid flowback may be utilized between the stop-start of the injection process. In another non-limiting embodiment, after the stop phase (i.e. after the 0.25 minutes to 60 minutes static fluid time period) and before the restart phase of the fluid injection, a select amount and rate of fluid may be flowed back towards the wellbore as a method to exert pressure in the production direction upon the residual polymer in the hydraulic fracture. Utility of hydraulic pressure and high fluid viscosity exerted in both the injection and production directions may dramatically improve cleanup of the residual polymer. The stop-start process may also improve cleanup of channels or voids in fractures created by heterogeneous placement of proppants.

In one non-limiting embodiment, the aliquots may be injected at regular stop-start intervals. Alternatively, in another non-limiting embodiment, the aliquots may be injected at irregular intervals. An aliquot is referred to here as a portion of the total amount of the VES gelled fluid. By 'regular intervals', it is defined herein to mean that the duration of each stop-start interval between all injections of each aliquot are of the same or very similar duration. 'Irregular intervals' are defined herein to mean that the duration of a stop-start interval may be of a different duration than a preceding or a following stop-start interval. The number of aliquots within the plurality of aliquots may range from about 2 independently to about 50 aliquots of the VES gelled fluid, or in an alternative embodiment from about 4 independently to about 20 aliquots of the VES gelled fluid. Each individual aliquot may have from about 2% independently to about 50% of the VES gelled fluid, or alternatively from about 5% independently to about 25% of the VES gelled fluid.

The viscoelastic surfactant gelled fluid may have water, at least one viscoelastic surfactant (VES) in an amount effective to increase the viscosity of the water, and at least one internal breaker. After the contacting of the residual polymer with the VES gelled fluid, any internal breakers within the VES gelled fluid may break down and reduce the viscosity of the VES gelled fluid, so that it may be easily flowed back from the reservoir along with the residual polymer during production of hydrocarbons, leaving little or no formation damage. The internal breaker may be the only agent present in the VES gelled fluid that reduces viscosity. In an alternative non-limiting embodiment, the VES gelled fluid may be heated to a temperature effective to cause the internal breaker to reduce the viscosity of the VES gelled fluid. The effective temperature may range from about 70 independently to about 300 degrees F. (about 21 to about 149 degrees C.).

The breaker components herein can be used as an internal breaker, e.g. added to the gel after batch mixing of a VES-gel treatment, or added on-the-fly after continuous mixing of a VES-gel treatment using a liquid additive metering system in one non-limiting embodiment. The internal breaker may be present in the water-soluble phase or in an oil-soluble internal phase of the water within the VES gelled fluid. Internal breakers suitable for the methods and compositions herein include transition metal ion sources, reducing agent sources, chelating agent sources, mineral oils, hydrogenated polyalphaolefin oils, saturated fatty acids, unsaturated fatty acids and combinations thereof. Bacteria may also be used alone or in conjunction with these internal breakers, although as noted, reducing the viscosity of VES gelled fluids with bacteria is relatively slow. The use of bacteria as a viscosity breaker for VES gelled fluids is described in U.S. Pat. No. 7,052,901 to Baker Hughes, incorporated herein in its entirety by reference. In one non-limiting embodiment, when the internal breaker is bacteria, the amount of bacteria may range from about 0.1 independently to about 2 vol % based on the VES gelled fluid.

The fatty acids may be in situ saponified within the reservoir with an alkaline compound selected from the group consisting of organic bases, alkali metal bases, alkaline earth metal bases, ammonium bases, and combinations thereof. The unsaturated fatty acids may be monoenoic acids, polyenoic acids, and mixtures thereof. The use of fatty acids for in situ saponification as a viscosity breaker for VES-gelled fluids is described in U.S. Pat. No. 7,728,044, incorporated herein in its entirety by reference. The use of auto-oxidation of unsaturated fatty acids as a method to break the viscosity of VES-gelled fluids is described in U.S. Pat. No. 7,645,724, incorporated herein in its entirety by reference. When the internal breaker is an unsaturated fatty acid, the amount of unsaturated fatty acid may range from about 100 independently to about 20,000 ppm based on the VES gelled fluid.

The use of transition metals as a viscosity breaker for VES-gelled fluids is described in U.S. Pat. No. 7,595,284, incorporated herein in its entirety by reference. The use of mineral oils as a method to break the viscosity of VES-gelled fluids is described in U.S. Pat. No. 7,347,266, incorporated herein in its entirety by reference. When the internal breaker is a transition metal ion source, the amount of transition metal ion from the transition metal ion source may range from about 0.01 independently to about 300 ppm based on the VES gelled fluid. When the internal breaker is a mineral oil, a hydrogenated polyalphaolefin oil, a saturated fatty acid, and combinations thereof, the amount of the internal breaker may range from about 0.1 independently to about 20 gptg (gallons per thousand gallons) based on the VES gelled fluid. When the internal breaker is a mineral oil, the amount of the mineral oil is at least about 0.002 vol % based on the VES gelled fluid.

The method may effectively remove residual polymer over a broad range of temperatures, such as from about 70 (about 21° C.) independently to about 350° F. (about 177° C.); alternatively up to about 80° F. (about 27° C.), and in another non-limiting embodiment up to about 280° F. (about 138° C.). With respect to pressure, in another non-limiting embodiment, effective pressures may range from about 250 psi (about 1.72 MPa) independently to about 15,000 psi (about 103.42 MPa). Alternatively, the lower end of the suitable pressure range may be about 500 psi (about 3.5 MPa), while the upper end may independently be about 12,000 psi (about 84 MPa). In another alternate embodiment, the lower end may be about 1000 psi and the upper end may independently be about 10,000 psi (about 7 MPa to about 70 MPa).

In addition, the VES gelled fluid may also include at least one pseudo-crosslinker to improve at least one fluid property, such as: low shear rate viscosity, high temperature viscosity stability, and fluid leakoff control. The pseudo-crosslinking agent may be selected from the group consisting of alkaline earth metal oxides, alkaline earth metal hydroxides, transition metal oxides, transition metal hydroxides. Suitable pseudo-crosslinking agents would include, but not necessarily be limited to alkaline earth metal oxides, alkaline earth metal hydroxides, transition metal oxides, transition metal hydroxides, such as MgO, ZnO and the like, pyroelectric particles, piezoelectric particles, and mixtures thereof. The effective amount of the pseudo-crosslinking agent may range independently from about 0.5 to about 200 pptg (about 0.06 to about 24 kg/m$^3$) based on the VES gelled fluid. Of the group of pseudo-crosslinkers listed, some are more effective as viscosity enhancers, while others are more effective as fluid loss control agents, but all work well as high temperature viscosity stabilizers.

The viscosity enhancers herein are believed to be particularly useful in VES-gelled fluids used for removing residual polymer and other uses and applications where the viscosity of VES-gelled aqueous fluids may be increased. It is especially useful that the viscosity enhancer particles may be very small to flow with VES fluid into the formation. It has been discovered that the addition of pyroelectric crystal and/or piezoelectric crystal particles to an aqueous VES gelled fluid demonstrate improved, enhanced or increased viscosity of the VES gelled fluid.

The discovery of the benefit of piezoelectric and/or pyroelectric crystals allows the VES gelled fluid to have improved fluid viscosity to enhance the ability of the VES fluid to inhibit, prevent or reduce the flow of fluid into a formation. Further, the introduction of these viscosity enhancers to the VES-gelled fluid will limit and reduce the amount of VES gelled fluid, which flows into the pores of a reservoir during a procedure to recover residual polymer. Enhancing the fluid viscosity of the VES-gelled fluids also helps reduce the amount of VES necessary to achieve a particular viscosity level. Thus the use of these viscosity enhancers in a VES-gelled aqueous system will improve the performance of the VES fluid while lowering treatment cost.

The VES gelled fluid may also include a pseudo-crosslinking particle that performs as a viscosity stabilizer. The viscosity stabilizers may be selected from the group consisting of magnesium oxide, magnesium hydroxide, calcium oxide, calcium hydroxide, sodium hydroxide, and mixtures thereof. The piezoelectric and/or pyroelectric crystal pseudo-crosslinkers have also been found to be suitable high temperature viscosity stabilizers. The concentration of pseudo-crosslinker for enhanced high temperature viscosity stability is typically less than the amount needed for viscosity enhancement and pseudo-filtercake fluid leakoff control. The viscosity stabilizers used herein would be in most cases for stabilizing or sustaining the VES gelled fluid viscosity at elevated fluid temperatures, such as above 200 degrees F. (93 degrees C.), as contrasted with increasing the fluid viscosity like viscosity enhancers may do. The viscosity stabilizer concentration typically may range from about 0.5 pptg to about 10 pptg (about 0.06 to about 1.2 kg/m$^3$), and more specifically from about 1 pptg to about 6 pptg (about 0.12 to about 0.72 kg/m³) loading. Suitable viscosity stabilizers include, but are not limited to, magnesium oxide, magnesium hydroxide, calcium oxide, calcium hydroxide, sodium hydroxide, and the like. The select viscosity stabilizers may, in one non-limiting embodiment, have an average particle size of 500 nanometers or less, that is, to be preferably small enough to be non-pore plugging. More information about using these oxides and hydroxides as high temperature viscosity stabilizers may be found in U.S. Pat. No. 7,343,972 issued Mar. 18, 2008 and U.S. patent application Ser. No. 11/849,820 filed Sep. 20, 2006, both of which are incorporated by reference herein in their entirety.

In another non-limiting embodiment, the VES gelled fluid may also include a pseudo-crosslinking agent that decreases the rate of fluid leak-off. The fluid loss control agent may be, selected from the group consisting of alkaline earth metal oxides, alkaline earth metal hydroxides, transition metal oxides, transition metal hydroxides, piezoelectric and/or pyroelectric crystals, and mixtures thereof. Suitable fluid loss agents would include, but not necessarily be limited to alkaline earth metal oxides, alkaline earth metal hydroxides, transition metal oxides, transition metal hydroxides, and mixtures thereof, such as MgO, ZnO and the like. More information on these fluid loss control agents may be found in U.S. Pat. No. 7,550,413 issued Jun. 23, 2009 incorporated by reference herein in its entirety.

Improving or decreasing fluid loss may also be accomplished by increasing the concentration or use of the nano-sized particles that enhance viscosity (i.e. use of TLM pseudo-crosslinking agent). The combination of both can occur, that is, an internal/matrix of the pore-type viscosity fluid loss control and external pseudo-filtercake development. In one non-limiting embodiment, the amount of fluid loss control agent ranges from about 6 to about 200 pptg (about 0.72 to about 24 kg/m³) based on the VES gelled fluid. It may be realized that certain materials, e.g. alkali metals and alkaline earth metals, may serve and function as "viscosity enhancer", "high temperature viscosity stabilizers", and as fluid loss agents within the fluids of the method described herein.

It is expected in one non-limiting embodiment that the fluid loss control agents would be primarily the nano-sized particles discussed above for fluid loss control and viscosity enhancing. Increasing the amount of these agents increases the building and efficiency of pseudo-filter cake. These particles include, but are not necessarily limited to the piezo- and pyroelectric particles, optionally in nano-sized form. Coarser or larger-sized transition metal oxide and/or transition metal hydroxides, such as MgO, may also be used alone or together with the nano-sized particles discussed immediately above. The effective amount of the fluid loss control/viscosity enhancing agent may range independently from about 6 to about 200 pptg (about 0.72 to about 24 kg/m³) based on the VES gelled fluid.

When properly placed, the VES gelled fluid may come into contact with the residual polymer in the hydraulic fracture. By the start-stop process, the viscosity of the VES-gelled fluid will exert hydraulic force on residual polymer lodged within the pores of the proppant within the hydraulic fracture. The exerted hydraulic force may move and breakdown at least a portion of the residual polymer mass and apparent yield stress. Once the polymer mass is moved, the related yield stress may lower, and the polymer mass may become more producible. The start-stop placement technique may also allow successive VES-gel stages to divert to portions of the hydraulic fracture where VES-gelled fluid has not been placed. The start-stop process may allow for more uniform placement of the VES-gelled treatment fluid in the existing hydraulic fracture compared to VES-gelled fluid without the use of pseudo-crosslinkers and the start-stop fluid placement technique. The viscosity of the VES gelled fluid may be reduced by the VES-type of internal breaker. The VES gelled fluid may optionally contain a polymer breaking agent to further degrade the residual polymer mass with which the VES gelled fluid may come into contact. Then, at least a portion of the residual polymer may be removed during reservoir production, along with the internally broken VES fluid.

EXAMPLE 1

Figure 1:
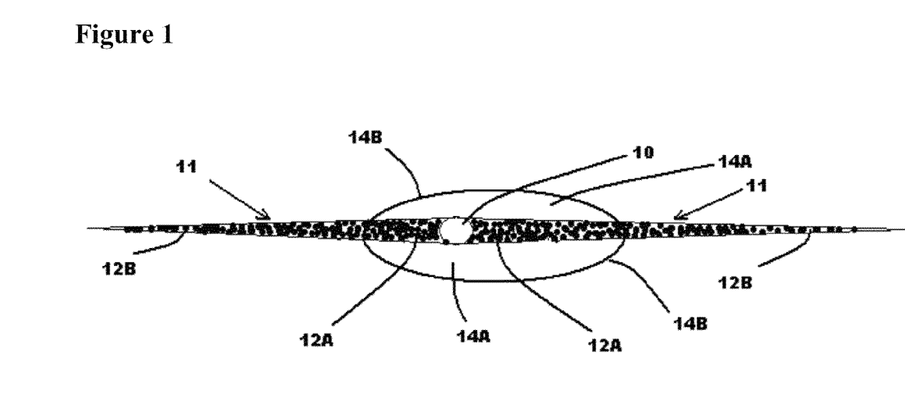
FIG. 1 is a schematic illustration of a top view of a wellbore and a hydraulic fracture.

Shown in FIG. 1 is a top view schematic illustration of a wellbore 10 with a schematic portrayal of a hydraulic fracture 11 extending in opposite directions (to the left and right of FIG. 1), where portions 12A are the near-wellbore sections of hydraulic fracture 11 and portions 12B are the near tip sections of hydraulic fracture 11. The area within oval-shaped region 14A represents the area of wellbore 10 and hydraulic fracture 11 commonly affected when a non-pseudo-crosslinked VES fluid is used to clean up polymer residue from the hydraulic fracture 11; the edge or total area typically treated by the non-diverting VES treatment fluid (i.e. leaks away from wellbore 10 and hydraulic fracture 11) is represented as area 14B. It may be seen that some of the treatment fluid does not remain within fracture 11, and more significantly that large portions of hydraulic fracture 11 are untreated, particularly the near tip sections 12B.

Figure 2:
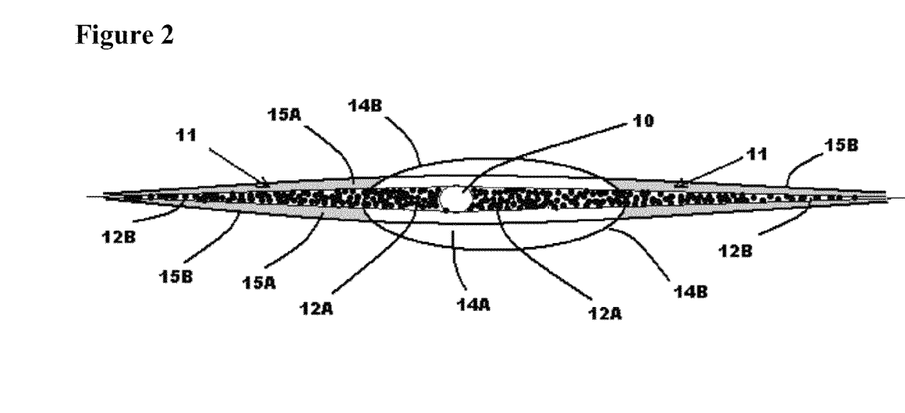
FIG. 2 is a schematic illustration of the top view of the wellbore and hydraulic fracture of FIG. 1 where the gray area indicates the placement of a VES-gelled fluid which upon breaking will remove at least a portion of residual polymer.

Shown in FIG. 2 is the top view schematic illustration of a wellbore 10 and hydraulic fracture 11, where a VES gelled fluid having pseudo-crosslinked micelles as described herein (i.e. with pseudo-filtercake leakoff control) has been injected into the wellbore 10 and fracture 11. The gray portion 15A is a schematic diagram of the area of the hydraulic fracture 11 that is treated with this VES gelled treatment fluid, where the gray area 15A shows improved treatment fluid placement, so that the outer total area designated as 15B may be treated. It may be seen that due to the start-stop fluid placement technique and of the treatment fluid's high viscosity at low and zero shear rates described herein having pseudo-crosslinked micelles, the fluid extends the entire length of the hydraulic fracture to the near tip sections 12B (i.e. the pseudo-crosslinked fluid primarily remains within the existing hydraulic fracture) and is not spent or leaked into the reservoir in the transverse direction indicted by area 14A and edge 14B.

EXAMPLE 2

Figure 3:
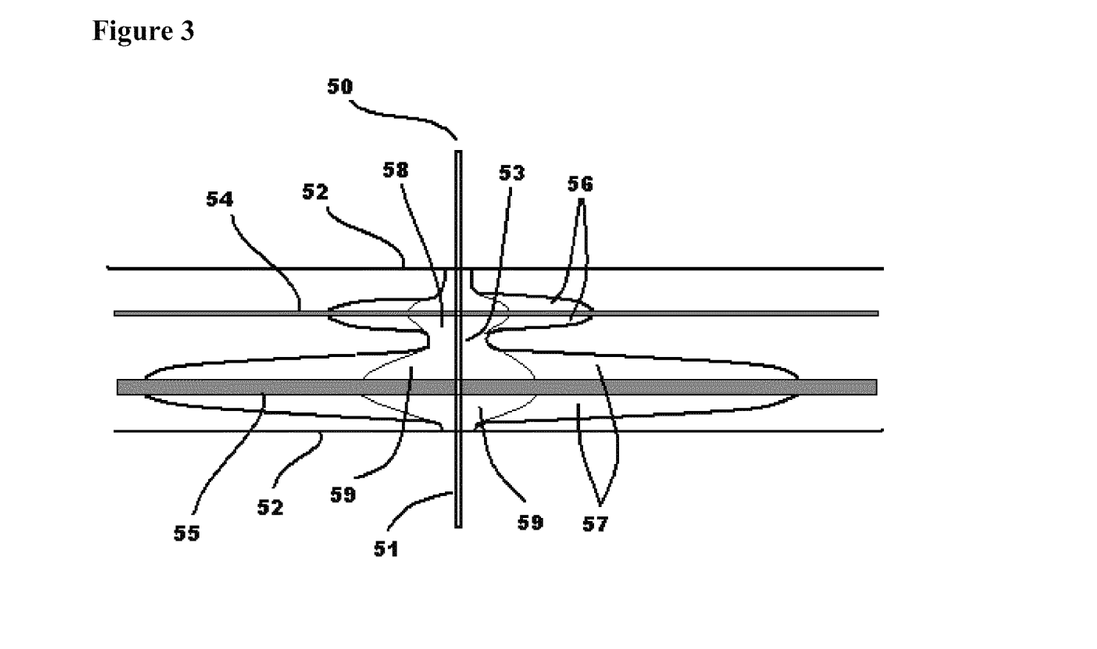
FIG. 3 is a schematic illustration of a cross-sectional, elevation view of a hydraulic fracture around a wellbore.

Shown in FIG. 3 is a cross-sectional, elevation view of hydraulic fracture and treatment fluid placements around a wellbore, where 50 is the top section of the wellbore, 51 is the bottom section of the wellbore, 52a and 52b represent the upper and lower boundaries, respectively, of the hydrocarbon-bearing reservoir 52 and the near wellbore section of the hydraulic fracture is shown at 53. Present within hydrocarbon-bearing reservoir 52 is an upper high permeability streak 54, and a lower high permeability streak 55 (which happens to be shown as deeper or having greater thickness than upper streak 54, in this non-limiting Example). Many hydrocarbon reservoirs have high permeable streaks like 54 and 55, relative to the total permeability of reservoir 52. Commonly during hydraulic fracturing most of the fracturing fluid enters the higher permeable streaks 54 and 55 during the fracturing process of reservoir 52. Areas 56 and 57 show a large fracture was formed from travelling down high permeability streak 55 and a smaller size fracture was created from fluid flow down high permeability streak 54, where most of the fractures produced within reservoir 52 exist around streaks 54 and 55.

Figure 4:
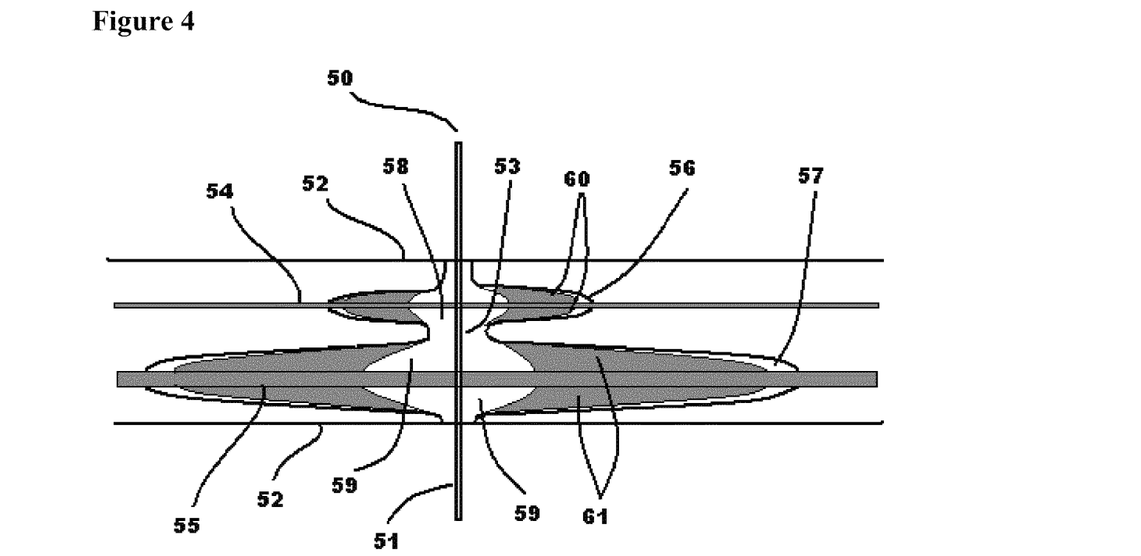
FIG. 4 is a schematic illustration of the cross-sectional, elevation view of the hydraulic fracture around a wellbore of FIG. 3 where the placement of a VES-gelled fluid is shown as a gray area.

In FIG. 3, the white areas 58 and 59 schematically illustrate the total area where a conventional VES-based cleanup fluid is placed. The illustration shows limited residual polymer cleanup fluid placement away from wellbore 50. FIG. 4 also shows limited treatment fluid placement areas 58 and 59. However, with efficient fluid loss control, and the utility of high fluid viscosity at ultra low shear rates by way of the start-stop fluid placement technique, pseudo-crosslinked VES-gel treatment fluid may remain predominantly within the existing hydraulic fracture and have more uniform distribution along the fracture from wellbore 50, as shown in pseudo-crosslinked VES treatment fluid placement areas 60 and 61. It may be seen that coverage using the VES gelled treatment fluids described herein is expected to be much greater than or at least as coextensive as the non-pseudo-crosslinked VES fluids to thus remove the residue polymer mass from existing hydraulic fractures. FIGS. 3 and 4 herein are roughly comparable to FIGS. 1 and 2 previously described, but from a cross-sectional point of view, rather than from above.

EXAMPLE 3

Figure 5:
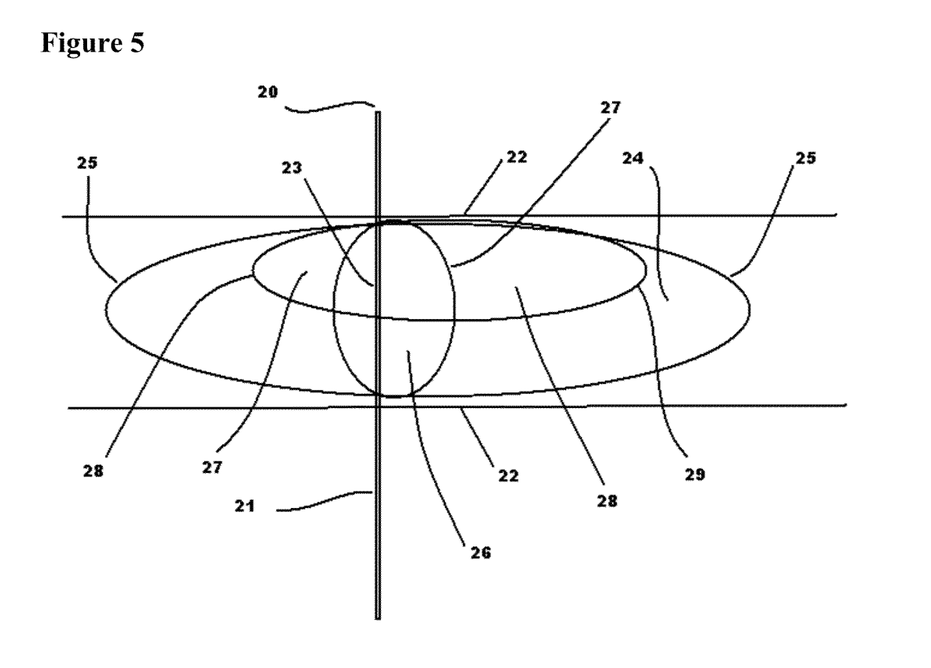
FIG. 5 is a schematic, cross-sectional, perspective view of wellbore and a hydraulic fracture.

Shown in FIG. 5 is a cross-sectional, perspective view of a hydraulic fracture and treatment fluid placement around a wellbore, where 20 is the top section of the wellbore, 21 is the bottom section of the wellbore, 22' and 22" represent the upper and lower boundaries, respectively, of the hydrocarbon-bearing reservoir 22. The hydraulic fracture 25 with fracture area 24 is shown. Conventional VES (i.e. non-pseudo-crosslinked) may have two scenarios of placement with fracture 25. Areas 23 and 26 represents where non-pseudo-crosslinked VES fluid typically remains around wellbore 20, and the same for total area 27 with respect to existing fracture 25. In both scenarios, poor and non-uniform placement of residual polymer cleanup treatment fluid may result within total fracture area 24. These areas are generally understood to be considerably less in volume than the entire area of fracture 24 and its boundary 25.

Figure 6:
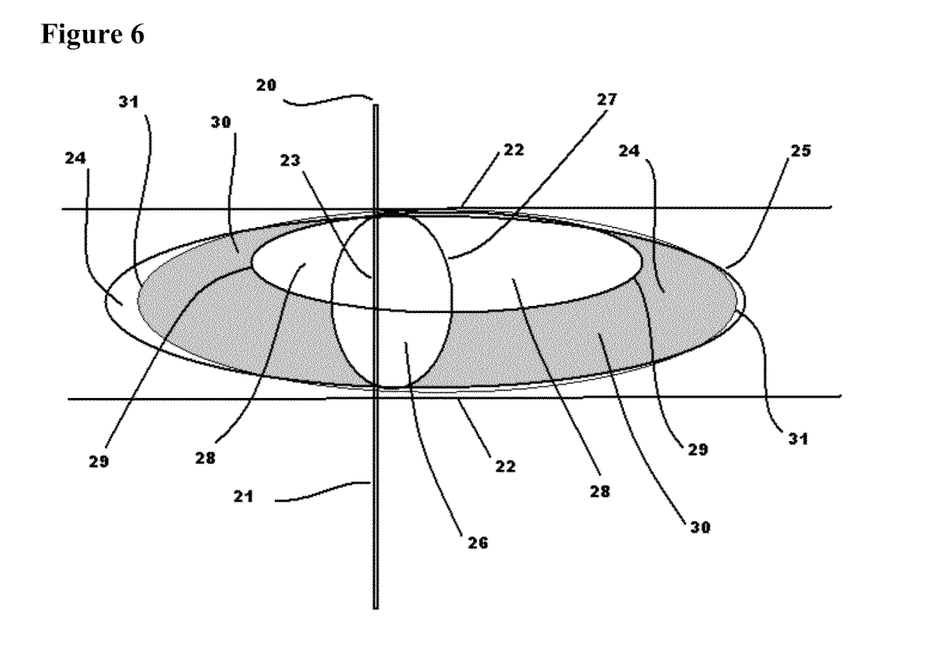
FIG. 6 is a schematic, cross-sectional, perspective view of the wellbore and hydraulic fracture of FIG. 5 where the gray area indicates placement of a VES gelled fluid illustrating near complete coverage of the fracture section.

Shown in FIG. 6 is the cross-sectional, perspective view of hydraulic fracture of FIG. 5 where gray area 30 schematically illustrates the potential area along fracture 24 where the VES gelled fluid may be placed. The edge 31 of this region 30 demonstrates nearly complete coverage of the fracture section 24 nearly to edge 25. FIG. 6 illustrates that the potential area 30 extends wider than first potential area 26 and deeper than second potential area 28. Thus, the VES gelled treatment fluids described herein are expected to contact most, if not all, of the areas where residual polymer is present since they will more fully extend through and treat more of the hydraulic fracture in which they are placed. More complete distribution of pseudo-crosslinked VES treatment fluid allows for more hydraulic pressure to be exerted on the polymer residue in the proppant of the hydraulic fracture during treatment fluid placement, which moves the polymer residue, as well as lowers the polymer mass yield stress for enhanced removal of residual polymer during reservoir fluids production.

EXAMPLE 4

Figure 7:
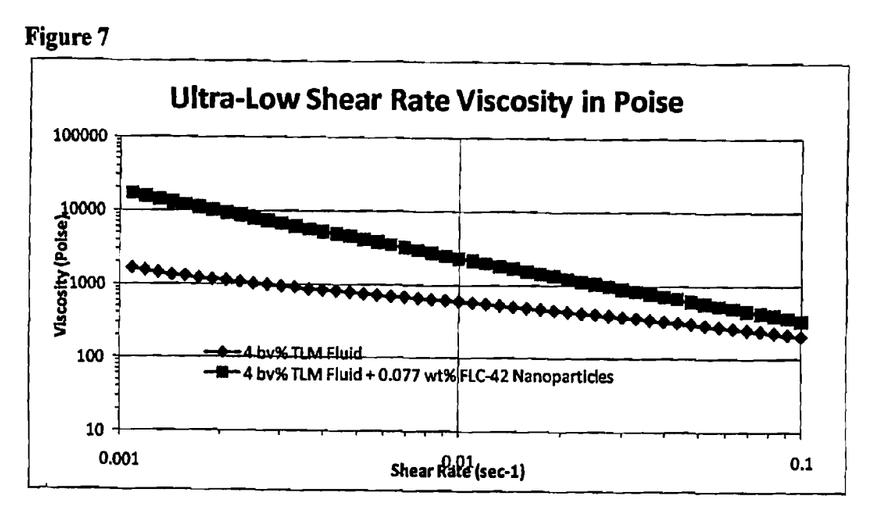
FIG. 7 is a graph of viscosity of a thread-like-micelle (TLM) fluid without and with 0.077 wt % FLC-42 nanoparticles as a function of ultra-low shear rate indicating that the presence of the nanoparticles increases viscosity.

FIG. 7 is a graph of viscosity of a TLM fluid without and with 0.077 wt % FLC-42 nanoparticles as a function of ultra-low shear rate. The data indicates that the presence of the pseudo-crosslinker FLC-42 (the top line of graph) increases viscosity up to ten-fold at ultra low shear rates. At $0.001\ s^{-1}$ shear rate, the TLM fluid without the pseudo-crosslinker (the bottom line of graph) was about 1800 Poise. The TLM with the pseudo-crosslinker FLC-42 was about 18000 Poise, which indicates a small amount of pseudo-crosslinker may significantly improve VES-gel viscosity at low shear rates. This would be observed by a stop and start interval for the pumping of the treatment fluid. Said differently, once the fluid flow is reduced to very low shear rates, the fluid may become significantly more viscous and may exert greater hydraulic pressure on the residual polymer mass within the pores of the proppant during fluid placement treatment. This may also divert clean-up fluid flow from areas of the fracture where the clean-up treatment fluid has already been placed for more uniform fluid distribution within the existing hydraulic fracture. This allows for greater fluid coverage and enhances residual polymer clean-up after the treatment.

EXAMPLE 5

Figure 8:
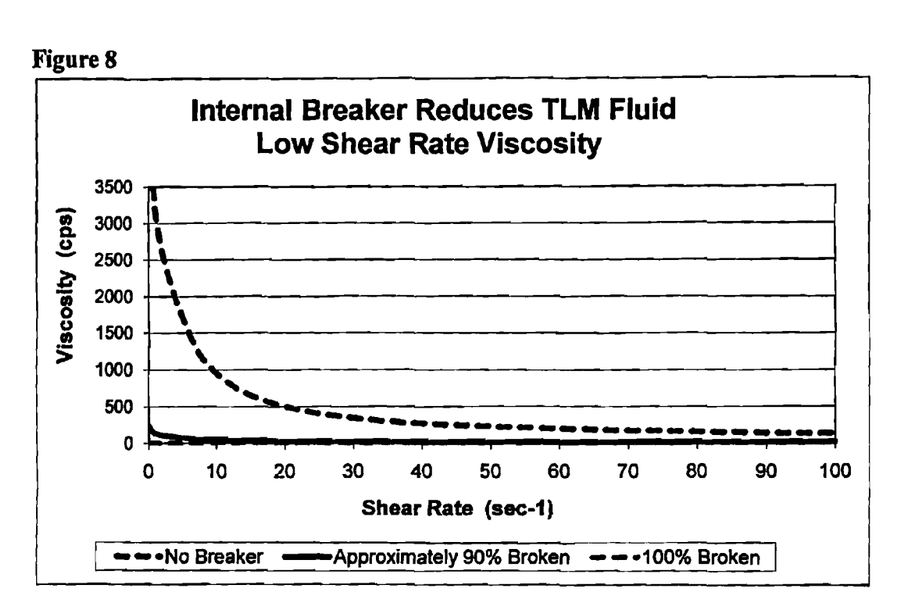
FIG. 8 is a graph of viscosity as a function of shear rate for tests with a 7% KCl brine fluid having 4% VES at 150° F. (66° C.) without a breaker and then with 3.0 gptg fish oil breaker showing approximately 90% broken and 100% broken states.

FIG. 8 is a graph of viscosity as a function of shear rate for tests with a 7% KCl brine fluid having 4% VES at 150° F. (66° C.) without a breaker (the top line) and then with 3.0 gptg fish oil (the bottom lines) breaker showing approximately 90% broken and 100% broken states. Thus, fish oil may be an effective and complete internal breaker for VES gelled treatment fluids to generate an easily producible fluid with detergency.

EXAMPLE 6

TABLE I

Results of Stop/Restart Tests 1-3

| Test | Pack | Fluid | Flowrate (mls/min) | Constant Flow Maximum Pressure (psi) | Restart Flow Maximum Pressure (psi) |
|---|---|---|---|---|---|
| 1 | 1-in. × 12-in (0.0254 m × .3048 m) 20/40 Mesh (841/400 microns) Unimen Sand | DI water 1 wt % TLM | 50 50 | <1 (<0.007 MPa) 76 (0.5240 MPa) | <1 (<0.007 MPa) 87 (0.5998 MPa) |
| 2 | 1-in. × 12-in (0.0254 m × 0.3048 m) 20/40 Mesh (841/400 microns) Unimen Sand | DI water 3 wt % TLM | 50 40 | <1 (<0.007 MPa) 95 (0.655 MPa) | <1 (<0.007 MPa) 189 (1.303 MPa) |
| 3 | 1-in × 6-in | DI water | 10 | <1 (<0.007 MPa) | <1 (<0.007 MPa) |

TABLE I-continued

Results of Stop/Restart Tests 1-3

| Test | Pack | Fluid | Flowrate (mls/min) | Constant Flow Maximum Pressure (psi) | Restart Flow Maximum Pressure (psi) |
|---|---|---|---|---|---|
| | (0.0254 m × 0.1524 m) 80/100 Mesh (177/149 microns) Unimen Sand | 1 wt % TLM | 2 | +300* (+2.068 MPa) | +300* (+2.068 MPa) |

Test 1 fluid flow was run through a 1-in (0.0254 m) diameter by 12-in (0.3048 m) long 20/40 mesh (841/400 microns) size pack of Unimen sand commonly used for hydraulic fracturing. The 1 wt % TLM fluid was composed of 3 wt % KCl brine, 0.072 wt % ZnO pseudo-crosslinker, 1 wt % gel-forming viscoelastic surfactant (WG-6L), and 0.15 wt % borate crosslinked guar breaker (E-21). Deionized (DI) water that was flowed through the frac sand showed less than 1 psi (0.007 MPa) at a constant flow rate of 50 mls per minute. After stopping and then restarting the DI water flow at 50 mls per minute, no noticeable instant pressure build was observed. The 1 wt % TLM fluid was then flowed through the frac sand pack at 50 mls per minute and showed a maximum constant flow pressure of 76 psi (0.5240 MPa). The flow of the 1 wt % TLM fluid was stopped for about one minute and then restarted at 50 mls per minute and the instant (i.e. less than 1 minute) maximum pressure build observed was 87 psi (0.5998 MPa), indicating that stop and restart of TLM fluid is different than water in 20/40 mesh (841/400 microns) porous media, and that once TLM fluid is stopped greater pressure is required to start treatment fluid flow again. Additionally, the TLM fluid constant flow pressure and the stop/restart pressure build are substantial and may be sufficient enough force to overcome at least some of the yield stress that residual polymer mass-material exhibits in porous media which in turn may cause at least a portion of the residual polymer mass to flow with the TLM treatment fluid.

Test 2 showed DI water having less than 1 psi pressure (0.007 MPa) through the 20/40 mesh (841/400 microns) sand pack at 50 mls per minute, the same as Test 1. The TLM composition was also the same as Test 1 except for a higher loading of 3 wt % WG-6L was used. The constant flow of the 3 wt % TLM fluid through the sand pack showed a maximum pressure of 95 psi (0.655 MPa). The stop and then restart of 40 mls per minute flow of the 3 wt % TLM treatment fluid showed an instant maximum pressure build of 189 psi (1.303 MPa). After the instant pressure build the continued flow of the 3 wt % TLM fluid at 40 mls per minute showed a final stable pressure of about 98 psi (0.676 MPa). The data from Test 2 appears to show that increasing the TLM concentration modestly increases the constant flow pressure in the frac sand but the stop and restart of fluid flow shows that the 3 wt % TLM loading gives about twice as much instant pressure compared to constant flow pressure, indicating that the start-stop fluid placement method may exert substantially more net pressure on residual polymer mass-material within porous media like frac sand. The much higher net pressure may overcome even more of the yield stress in which residual polymer material exhibits within proppant packs. However, the constant flow pressure may be sufficiently high enough to do the same, in many cases, and the start-stop fluid placement technique may not be needed in every residual polymer in hydraulic fracture cleanup treatment.

Figure 11:
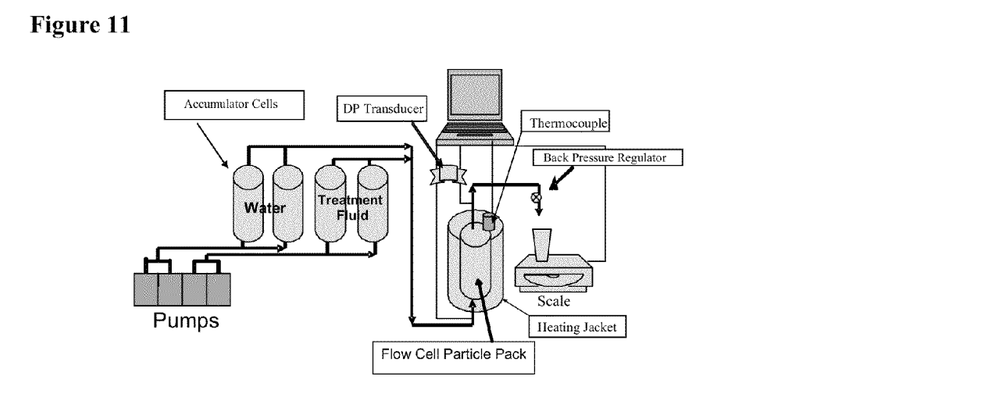
FIG. 11 is a diagram of the test apparatus used for each TLM fluid flow test.

Test 3 was with 1-in. (0.0254 m) by 6-in. (0.1524 m) 80/100 mesh (177/149 microns) sieved Unimen sand to simulate a flow through of a fine grain unconsolidated sandstone formation. DI water was flowed through at 10 mls per minute, and after the flow was stopped, the restart of DI water at 50 mls per minute showed no instant pressure and was less than 1 psi (0.007 MPa). However, the flow of the 1 wt % TLM fluid with the composition of TLM fluid of Test 1 showed extremely high resistance to flow within the tiny pores of the 80/100 mesh (177/149 microns) sand, and showed greater than 300 psi (2.068 MPa) at only 2 mls per minute of constant fluid flow. The flow test apparatus had a pressure transducer maximum pressure limit of 300 psi (2.068 MPa). During the 2 mls per minute fluid flow, only a limited amount of the TLM fluid was passed through the 6 in (0.1524 m) sand pack. Less TLM structures (apparent by lack of fluid viscosity of fluid discharged from sand pack) were produced over time during the constant flow pressure build period, indicating the pseudo-crosslinked networked TLM structures were being concentrated within the 80/100 mesh (177/149 microns) sand pack. The TLM trapping appeared to induce high viscosity fluid within the fine grain sand and thereby caused a very low flow rate of 2 mls per minute to exhibit greater that 300 psi (2.068 MPa) pressure. After the flow test, the 80/100 mesh (177/149 microns) sand pack was visually inspected and highly viscous TLM fluid was evident in approximately the first three inches of the sand pack. The data from Test 3 appears to show that the concentration of TLM fluid may be utilized at a very low concentration, which reduces treatment cost. However, low concentrations of TLM should still prefer to flow within the 20/40 mesh (841/400 microns) frac proppant and not into the formation (such as fine grain sandstone) and thereby flow further along the hydraulic fracture and much further from the wellbore for more efficient treatment fluid placement in fracture proppant. FIG. 11 is a schematic illustration of the apparatus used for the flow and cleanup tests. The 300* indicates the maximum transducer pressure was 300 psi for the test system. During Test 3, the tests were concluded once the pressure reached the maximum 300 psi. Greater than 300 (i.e. +300) psi pressure would have occurred during Test 3 if a higher capacity transducer was used.

TABLE II

Results of Test 4

| Test | Pack | Fluid | Flowrate (mls/min) | Pore Volume | Constant Flow Maximum Pressure (psi) |
|---|---|---|---|---|---|
| 4 | 1-in. × 6-in (0.0254 m × 0.1524 m) 20/40 Mesh (841/400 microns) + Broken crosslinked polymer residue | Initial DI water 1 wt % TLM  Final DI water | 10 and 80 10 80 10 80 | 8 2 8 4 4 | <1 (<0.007 MPa) 21 (0.145 MPa) 45 (0.310 MPa) <1 (<0.007 MPa) <1 (<0.007 MPa) |

Test 4 was performed using 1-in diameter by 6-in (0.0254 m) long 20/40 mesh (841/400 microns) Unimen frac sand. A high loading of residual borate crosslinked guar polymer fluid, already viscosity broken by oxidizer breaker (sample bottle 4 of FIG. 9), was loaded simultaneously in the flow cell with the 20/40 mesh (841/400 microns) proppant. The 1 wt % TLM fluid was composed of 3 wt % KCl brine, 0.072 wt % ZnO pseudo-crosslinker, 1 wt % gel-forming viscoelastic surfactant (WG-6L), 0.15 wt % borate crosslinked guar breaker (E-21), and 0.5 by % TLM internal breaker (GBW-407L). The proppant pack was initially cleaned up with DI water at 10 mls per minute followed by 80 mls per minute. 4A depicts the effluent collected during the 10 ml/min flow, and 4B and 4C depicts the effluent collected during the 80 ml/min. The remedial cleanup fluid (i.e. the TLM fluid) was then injected through the proppant pack. The initial TLM fluid injection rate was a constant 10 mls per minute for two pore volumes (sample 4D of FIG. 9) followed by a constant 80 mls per minute for eight pore volumes (sample 4E of FIG. 9). The fluid flow was then stopped and the remedial cleanup fluid was shut in to allow the injected TLM fluid to break in viscosity and to allow the polymer breaker to further degrade residual polymer it may have contacted. After the shut in period, DI water was flowed through the flow cell at 10 mls per minute followed by 80 mls per minute. Effluent samples were collected for each of the polymer cleanup stage and are shown in FIG. 9.

Test 4 was to observe the effectiveness of the DI water and TLM fluid to remove broken crosslinked polymer residue trapped in a 20/40 mesh (841/400 microns) proppant. The effluent samples collected during the polymer cleanup test are shown in FIG. 9. The proppant pack was injected with DI water to initially clean up the polymer material within the proppant pack. Sample 4A in FIG. 9 shows the effluent produced during the initial 10 mls per minute of DI water injection, and showed a slight amount of a polymer material produced. The DI water was then flowed at 80 mls per minute and the effluent collected (Samples 4B and 4C in FIG. 9) contained very little produced polymer. The initial cleanup test with DI water showed the broken polymer residue was trapped in the pores of the proppant and water alone was inefficient for removing the residual polymer material. The 1 wt % TLM fluid was then injected through the 20/40 mesh (841/400 microns) proppant pack for about ten pore volumes to try and use viscosity and rate to displace the residual polymer material from the proppant. The initial injection rate was 10 mls/min and then it was increased to 80 mls/min. The initial two pore volumes of viscous pseudo-crosslinked TLM fluid at 10 mls/min (Sample 4D in FIG. 9) showed noticeably more polymer material was produced compared to the initial DI water Sample 4A effluent and approximately the same as the viscous effluent produced at 80 mls/min (Sample 4E in FIG. 9). The use of TLM viscosity and rate alone, with no start-stop process, showed a fair amount of residual polymer may be removed, as shown in Samples 4D and 4E. The viscous remedial cleanup fluid was then shut in to allow the internal breaker to degrade the pseudo-crosslinked TLMs and allow the polymer breaking agent to degrade polymeric material it may have contacted.

Figure 9:
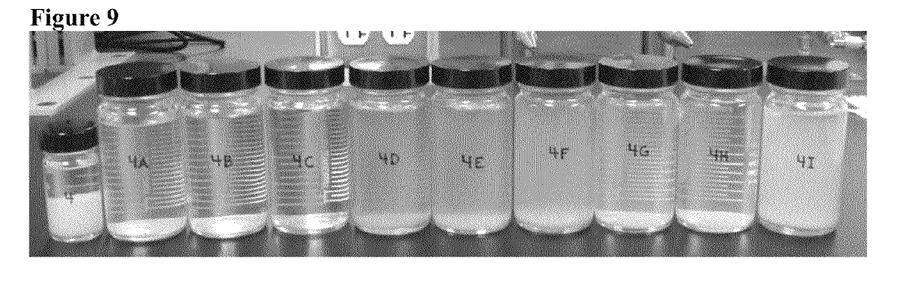
FIG. 9 is a depiction of the effluent samples collected for each of the polymer clean-up stage as discussed below with respect to Test 4.
Figure 10:
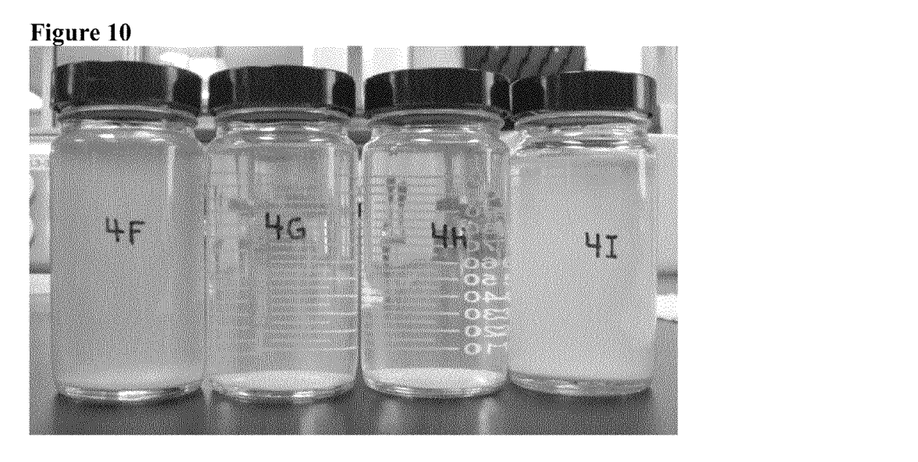
FIG. 10 is a close-up depiction of 4 vials from FIG. 9.

Samples 4F, 4G and 4H in FIGS. 9 and 10 show the effluent samples collected during final DI water cleanup stage. The initial four pore volumes were at 10 mls/min (Sample 4F in FIGS. 9 and 10) and the next four pore volumes were at 80 mls/min (Samples 4G and 4H in FIGS. 9 and 10). Sample 4F in FIGS. 9 and 10 effluent contained the shut in remedial cleanup fluid, which showed water-like viscosity, indicating the internal breaker had effectively viscosity-broken the injected pseudo-crosslinked TLM remedial cleanup fluid. Sample 4F in FIGS. 9 and 10 further showed that a fair amount of polymeric material was produced, indicating the TLM fluid had been effective to clean up additional residual polymer material from the simulated proppant pack. After the cleanup test, the 20/40 mesh proppant pack was taken out of the flow cell and washed with DI water. Sample 4I in FIGS. 9 and 10 shows the amount of polymer material retained in the proppant pack after the residual polymer cleanup fluid test.

In the foregoing specification, the invention has been described with reference to specific embodiments thereof as effective in removing residual polymer from a hydraulic fracture using viscoelastic surfactant gelled fluids. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations of brines, viscoelastic surfactants, internal breakers and chemicals, and other agents, and other components falling within the claimed parameters, but not specifically identified or tried in a particular composition, are anticipated to be within the scope of this invention.

The present invention may suitably comprise, consist or consist essentially of the elements disclosed and may be practiced in the absence of an element not disclosed. For instance, the method may consist of or consist essentially of a method for removing a residual polymer from a hydraulic fracture.

The words "comprising" and "comprises" as used throughout the claims, are to be interpreted to mean "including but not limited to" and "includes but not limited to", respectively.

What is claimed is:

1. A method for removing a residual polymer from a hydraulic fracture comprising not necessarily in this order:
   injecting a plurality of aliquots of viscoelastic surfactant (VES) gelled fluid into a subterranean formation, where a stop-start interval exists between the injection of each aliquot, where the viscoelastic surfactant gelled fluid comprises:
water; and
at least one viscoelastic surfactant in an amount effective to increase the viscosity of the water;
contacting at least some of the residual polymer in the hydraulic fracture with the VES gelled fluid;
reducing the viscosity of the VES gelled fluid with an internal breaker to form a broken fluid where the internal breaker is present in an oil-soluble internal phase of the water of the VES gelled fluid; and
removing at least a portion of the residual polymer along with a majority of the broken fluid.

2. The method of claim 1 where the viscoelastic surfactant gelled fluid further comprises at least one internal breaker selected from the group consisting of bacteria, transition metal ion sources, saponified fatty acids, mineral oils, hydrogenated polyalphaolefin oils, saturated fatty acids, unsaturated fatty acids, and combinations thereof.

3. The method of claim 2 where the saponified fatty acids are soap reaction products of a fatty acid with an alkaline compound selected from the group consisting of organic bases, alkali metal bases, alkaline earth metal bases, ammonium bases, and combinations thereof.

4. The method of claim 2 where the unsaturated fatty acids are selected from the group consisting of monoenoic acids, polyenoic acids, and mixtures thereof.

5. The method of claim 2 where: when the internal breaker is bacteria, the amount of bacteria ranges from about 0.1 to about 2 vol %, when the internal breaker is a transition metal ion source, the amount of transition metal ion from the transition metal ion source ranges from about 0.01 to about 200 ppm, when the internal breaker is a saponified fatty acid, the amount of saponified fatty acid ranges from about 200 to about 10,000 ppm, when the internal breaker is selected from the group consisting of mineral oils, hydrogenated polyalphaolefin oils, saturated fatty acids, unsaturated fatty acids and combinations thereof, the amount of internal breaker ranges from about 100 to about 20,000 gptg; all based on the VES gelled fluid.

6. The method of claim 1, wherein the VES-gelled fluid further comprises a pseudo-crosslinker in an amount effective to associate thread-like-micelle structures together.

7. The method of claim 6 where the pseudo-crosslinker improves a characteristic of the VES gelled fluid selected from the group consisting of low shear rate viscosity, high temperature viscosity stability, fluid loss control, and combinations thereof.

8. The method of claim 6 where the pseudo-crosslinker is selected from a group consisting of alkaline earth metal oxides, alkaline earth metal hydroxides, transition metal oxides, piezoelectric particles, pyroelectric particles, and mixtures thereof.

9. The method of claim 6 where the amount of the pseudo-crosslinker ranges from about 1 pptg to about 50 pptg.

10. The method of claim 1 where the plurality of aliquots comprises from about 2 to about 50 aliquots of the VES gelled fluid.

11. The method of claim 1 where each aliquot comprises from about 2% to about 50% of VES gelled fluid.

12. The method of claim 1 where the stop-start interval comprises from about 0.25 minutes to about 60 minutes between the injecting of each aliquot.

13. The method of claim 1 where the aliquots are injected at regular stop-start intervals.

14. The method of claim 1 where the aliquots are injected at irregular intervals.

15. The method of claim 1 further comprising heating the VES gelled fluid to a temperature effective to cause the internal breaker to reduce the viscosity of the VES gelled fluid.

16. The method of claim 15 where the effective temperature ranges from about 70 to about 300 degrees F. (about 21 to about 149 degrees C.).

17. The method of claim 1 where the internal breaker is a mineral oil and is at least about 0.002 wt % paraffin.

18. The method of claim 1 where the internal breaker is the only agent present in the VES gelled fluid that reduces viscosity.

19. A method for removing a residual polymer from a hydraulic fracture comprising not necessarily in this order:
injecting a plurality of aliquots of viscoelastic surfactant (VES) gelled fluid into a subterranean formation, where a regular stop-start interval exists between the injection of each aliquot, where the regular stop-start interval comprises from about 0.5 minutes to about 30 minute between the injecting of each aliquot, where the viscoelastic surfactant gelled fluid comprises:
water;
at least one viscoelastic surfactant in an amount effective to increase the viscosity of the water; and
at least one internal breaker selected from the group consisting of bacteria, transition metal ion sources, saponified fatty acids, mineral oils, hydrogenated polyalphaolefin oils, saturated fatty acids, unsaturated fatty acids, and combinations thereof;
contacting at least some of the residual polymer in the hydraulic fracture with the VES gelled fluid;
reducing the viscosity of the VES gelled fluid with the internal breaker to form a broken fluid; and
removing at least a portion of the residual polymer along with a majority of the broken fluid.

20. The method of claim 19 where the plurality of aliquots comprises from about 2 to about 50 aliquots of the VES gelled fluid.

21. The method of claim 19 where each aliquot comprises from about 2% to about 50% of VES gelled fluid.

* * * * *